(12) United States Patent
Yozell-Epstein et al.

(10) Patent No.: US 7,243,298 B2
(45) Date of Patent: Jul. 10, 2007

(54) METHOD AND COMPUTER-READABLE MEDIUM FOR PREVIEWING AND PERFORMING ACTIONS ON ATTACHMENTS TO ELECTRONIC MAIL MESSAGES

(75) Inventors: Rebekah Yozell-Epstein, Seattle, WA (US); Aaron Hartwell, Duvall, WA (US); Hernan Savastano, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 10/955,361

(22) Filed: Sep. 30, 2004

(65) Prior Publication Data

US 2006/0069990 A1  Mar. 30, 2006

(51) Int. Cl.
*G07F 17/21* (2006.01)
(52) U.S. Cl. ..................................... 715/500
(58) Field of Classification Search ............. 715/500
See application file for complete search history.

(56) References Cited

U.S. PATENT DOCUMENTS

| | | | |
|---|---|---|---|
| 5,307,086 A | 4/1994 | Griffin et al. | 345/808 |
| 5,579,466 A | 11/1996 | Habib et al. | 715/529 |
| 5,640,580 A | 6/1997 | Slayden et al. | 715/527 |
| 5,652,901 A | 7/1997 | Slayden et al. | 715/527 |
| 5,680,629 A | 10/1997 | Slayden et al. | 715/527 |
| 5,694,610 A | 12/1997 | Habib et al. | 715/531 |
| 5,818,447 A | 10/1998 | Wolf et al. | |
| 5,838,320 A | 11/1998 | Matthews, III et al. | 345/786 |
| 5,903,905 A | 5/1999 | Andersen et al. | 715/526 |
| 6,134,566 A | 10/2000 | Berman et al. | 715/526 |
| 6,405,225 B1 | 6/2002 | Apfel et al. | |
| 6,734,883 B1 | 5/2004 | Wynn et al. | 345/830 |
| 2003/0076322 A1 | 4/2003 | Ouzts et al. | 345/440 |
| 2004/0068545 A1 | 4/2004 | Daniell et al. | |
| 2004/0158607 A1 | 8/2004 | Coppinger et al. | |
| 2005/0117032 A1* | 6/2005 | Ueda et al. | 348/231.4 |
| 2006/0031775 A1* | 2/2006 | Sattler et al. | 715/769 |

FOREIGN PATENT DOCUMENTS

| | | |
|---|---|---|
| EP | 1 182 600 A2 | 2/2002 |
| GB | 2 237 581 A | 9/2000 |

OTHER PUBLICATIONS

Barber, Nan et al., Office X for Macintosh: The Missing Manual, O'Reilly Publishing, © Jul. 2002.*

* cited by examiner

*Primary Examiner*—Doug Hutton
(74) *Attorney, Agent, or Firm*—Merchant & Gould

(57) ABSTRACT

A method and computer-readable medium are provided for previewing and performing actions on attachments to electronic mail messages. A first window pane is displayed that includes a list of e-mail messages and information identifying any attachments to the e-mail messages. When an attachment is selected, a preview is generated for the attachment and displayed in a second window pane adjacent to the first window pane. Actions that may be performed on the attachment are also identified and made available. One provided action includes the ability to quickly generate a reply message to the e-mail that includes a changed version of the original attachment.

9 Claims, 5 Drawing Sheets

METHOD AND COMPUTER-READABLE MEDIUM FOR PREVIEWING AND PERFORMING ACTIONS ON ATTACHMENTS TO ELECTRONIC MAIL MESSAGES

CROSS-REFERENCE TO RELATED APPLICATIONS

This patent application is related to concurrently filed U.S. patent application Ser. No. 10/954,328 entitled "Method, System, and Apparatus for Providing A Document Preview" which is expressly incorporated herein by reference.

BACKGROUND OF THE INVENTION

Users of electronic mail ("e-mail") client application programs are commonly frustrated by the number of steps that must be taken by a user to view the contents of a document that has been attached to an e-mail message. In many cases, a user only wants to see a preview of the attachment. A preview is a read-only rendering of a document that mimics what a user would have seen if the document was opened with an application program associated with the document. However, in the typical case, the user is required to select the attachment and then launch the application program associated with the attachment to view its contents.

When this traditional process for viewing the contents of an e-mail attachment is performed, the user is required to change application contexts between the e-mail client application and the application utilized to view the attachment. When the user has finished viewing the attachment, the user must again switch application contexts by closing the application program and returning to the e-mail client application. Switching application contexts in this manner to view a preview of an e-mail attachment can be both time consuming and frustrating for a user.

Users of e-mail client application programs may also be frustrated by the number of steps necessary to create a reply to an e-mail message with changes to an attached document. In the typical case, a user must select the attached document for editing to open an application program for editing the document. Once the document has been opened for editing, the user may make their changes. When the changes are completed, the changed document must be saved in a location on the computer, oftentimes on the user interface desktop. Then, the user must create an e-mail message in reply to the original message and attach the changed document to the reply message. Then, the changed document can be transmitted with the e-mail message. This extensive process for replying to an e-mail message with an attachment with changes to the attachment can also be time consuming and frustrating for a computer user.

It is with respect to these considerations and others that the various embodiments of the present invention have been made.

BRIEF SUMMARY OF THE INVENTION

In accordance with the embodiments of the present invention, the above and other problems are solved by a method and computer-readable medium for previewing and performing actions on attachments to e-mail messages. The various embodiments of the invention allow a user to quickly preview the contents of e-mail attachments without switching application contexts. Moreover, a user can quickly perform a number of custom actions on e-mail attachments, including the quick creation of a reply message that includes an attachment with changes.

According to one embodiment of the invention, a method is provided for generating a visual preview of a document attached to an e-mail message. According to the method, header information may be displayed for a number of e-mail messages in a list pane. The header information may include such items as the identity of the sender, a subject line, the time the e-mail message was sent and other information. Along with the header information, an indication is displayed for each attachment to an e-mail message that identifies the attachment and indicates the e-mail message to which it has been attached. The attachment indication may include an icon identifying the type of the attachment, the name of the attachment, the size of the attachment and other information.

According to other aspects of the invention, the attachment indication may be selected by a user. In response to the selection, a preview is generated of the attachment and displayed in an adjacent window pane. Because the preview is displayed within an adjacent window pane, no application context switch is necessary to view the preview. Other attachments may also be selected and previewed in the adjacent window pane one at a time.

According to other aspects of the invention, actions that may be performed on the attachment may be identified based on the attachment file type. User interface objects, such as selectable buttons, may be displayed for the actions that may be performed on the attachment. The actions may be displayed adjacent to the preview of the attachment. For instance, if the attachment comprises a picture, one action that may be performed is the generation of an image slide show for the picture and any other pictures attached to the message. The slide show may be launched by selecting the user interface object corresponding to the slide show.

According to other aspects of the invention, if the attachment comprises a document, an action may be provided that allows the quick creation of a reply message that includes a changed version of the document. When selected, this action will cause an application program to be launched for editing the document. Through the application program, the user can modify the document. When the user has completed the modifications, the user may elect to transmit the reply message with the changed document attached. When the reply message has been sent, the user is returned to the preview display.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
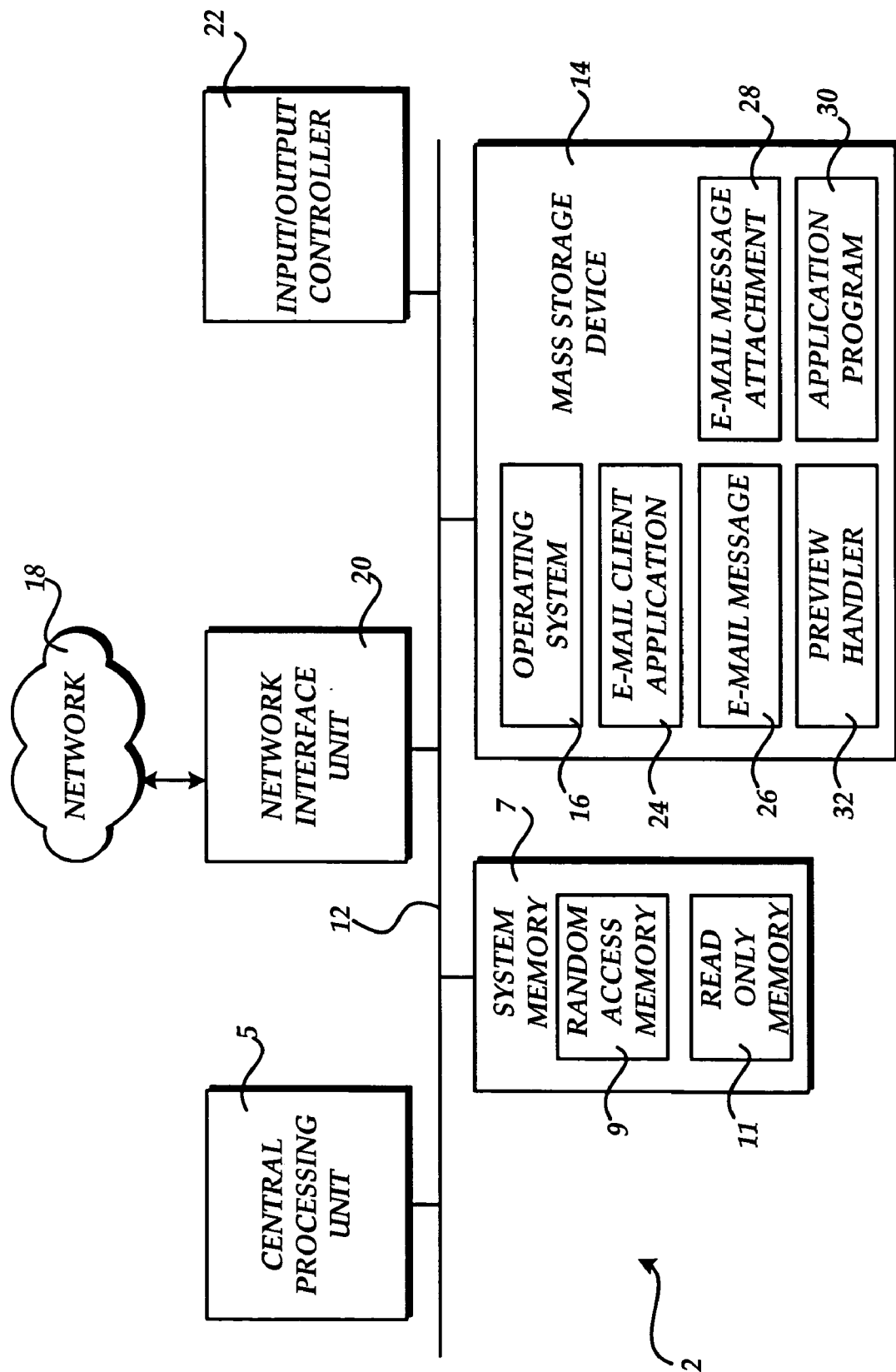
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and RAM 9 may store an e-mail client application 24. The e-mail client application 24 is operative to send and receive e-mail messages 26 over the network 18. The e-mail messages sent or received may also include attachments 28. The attachments may comprises any file type, and commonly include pictures, word processing documents, compressed files, and other types of files.

As will be described in greater detail herein, the e-mail client application 24 is operative to provide a user interface for displaying a preview of a document attached to an e-mail message without requiring a user to switch to another application program. Details regarding the user interface and a process for generating the interface are provided below with respect to FIGS. 2 and 4, respectively. The e-mail client application 24 is also operative to identify one or more actions that may be performed on a document attached to an e-mail messages. User interface objects for performing the actions may be displayed to a user as a part of the preview user interface.

One of the actions provided by the e-mail client application 24 comprises an action for quickly generating an e-mail message in reply to an e-mail message having an attachment. The reply e-mail message includes a changed version of the original attachment. In order to provide this functionality, the e-mail client application 24 may launch an application program 30 capable of editing the original attachment. The user may then be permitted to edit the attachment and quickly transmit the changed attachment as a reply to the original e-mail message. Additional details regarding an action for replying to an e-mail message with a changed attachment are provided below with respect to FIGS. 3 and 5.

According to embodiments of the invention, the e-mail client application 24 comprises the OUTLOOK personal information manager application program from MICROSOFT CORPORATION. It should be appreciated, however, that the invention may be utilized with other application programs capable of sending and receiving e-mail messages provided by other manufacturers. According to embodiments of the invention, the application 30 comprises a word processing application program, such as the WORD word processing application program from MICROSOFT CORPORATION. It should be appreciated, however, that other types of application programs and other word processing application programs from other manufacturers may be utilized to embody the various aspects of the present invention.

In order to generate the preview of an attachment to an e-mail message, the e-mail client application 24 utilizes the services of a preview handler 32. The preview handler 32 is responsible for locating and executing a previewer capable of generating a visual preview for the attachment. The previewer renders the preview into a window provided by the e-mail client application 24. In this manner, the preview appears to have been rendered by the e-mail client application program 24 even though it was rendered by a separate previewer. The operation of an illustrative preview handler is described in concurrently filed U.S. patent application Ser. No. 10/954,328 and entitled "Method, System, and Apparatus for Providing A Document Preview" which is expressly incorporated herein by reference.

Figure 2:
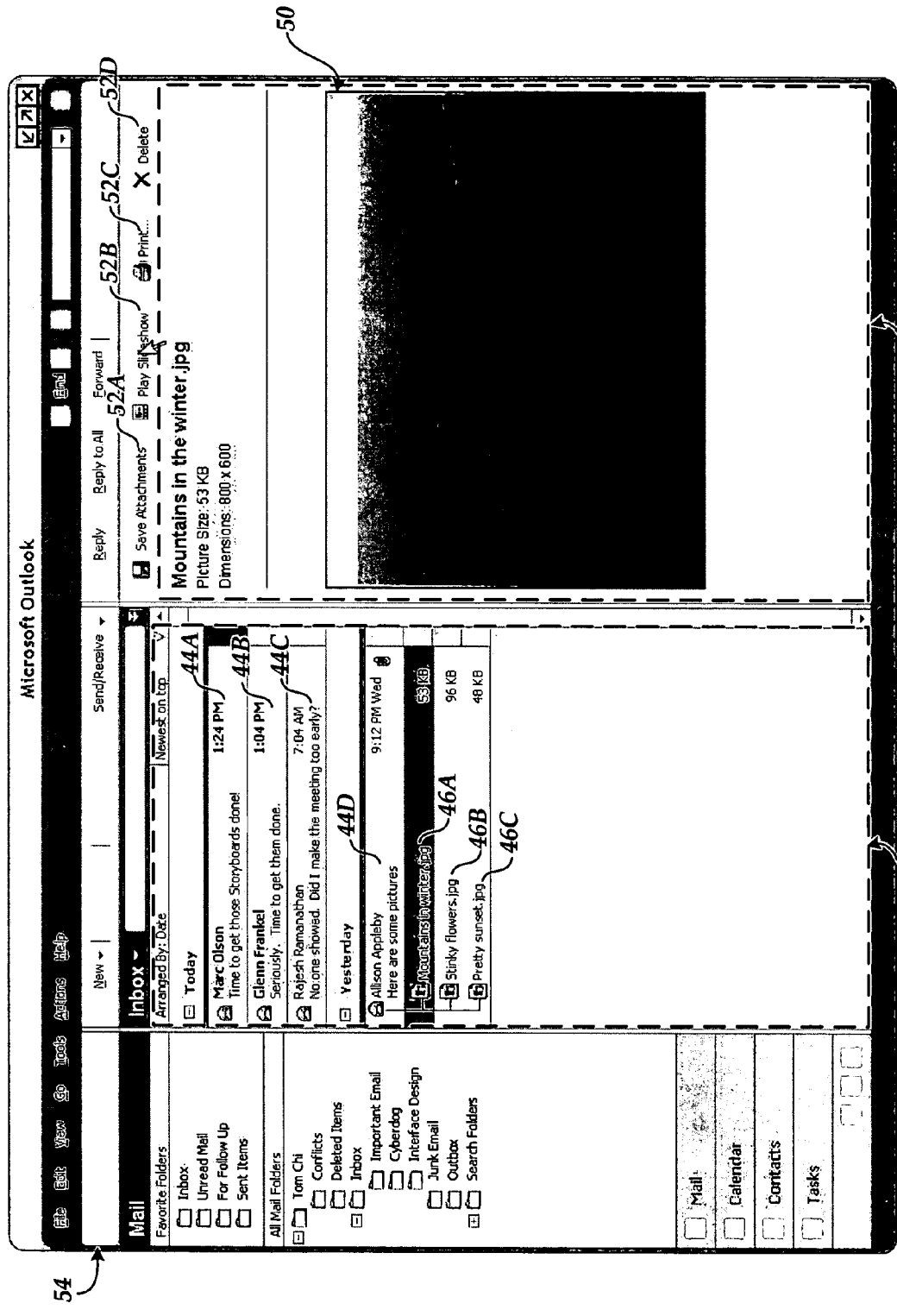
FIGS. 2 and 3 are screen display diagrams illustrating several screen displays provided by the various embodiments of the invention.

Referring now to FIG. 2, an illustrative user interface provided by the various embodiments of the invention will be described. In particular, FIG. 2 shows a screen display 40 generated by the e-mail client application 24. The screen display 40 comprises a user interface window having a list pane 42 in which one or more e-mail messages 44A-44D are identified. As shown in FIG. 2, the e-mail messages 44A-44D are identified by displaying a portion of the e-mail header information including the sender's name, the message subject, and the time the message was sent. It should be appreciated that other information may be displayed to identify the e-mail messages 44A-44D in the list pane 42.

As shown in FIG. 2, the e-mail message 44D includes three attached documents 46A-46D. The attachments 46A-46C are indicated as being attachments to the e-mail message 44D by a line extending from the e-mail message 44D to each of the attachments. Moreover, the attachments 46A-46C are identified by an icon corresponding to the document type, by the name of the each attachment, and by an indication of the size of each attachment. The indicator for the attachments 46A-46C are also offset from the indicator for the e-mail message 44D to indicate the child/parent relationship. Other types of information may also be displayed for each attachment. A paperclip icon is also displayed in conjunction with the e-mail message 44D to indicate that attachments are present but any type of icon or visual indicator may be utilized.

According to aspects of the invention, a user may select one of the attachments 46A-46C utilizing an appropriate user input device. For instance, a single mouse click may be made upon the attachment 46A to select the attachment. In response to such a selection, a preview 50 will be generated of the attachment and displayed in the reading pane 48. The reading pane 48 is displayed adjacent to the list pane 42. The reading pane 48 may also include other information regarding the attachment 46A such as the name of the attachment and the size of the attachment. Information particular to a type of attachment may also be displayed such as the number of pixels in an attached picture.

According to aspects of the invention, the e-mail client application 24 may also be operative to identify one or more actions that can be performed upon an attachment and to display the available actions in conjunction with the preview 50. For instance, as shown in FIG. 2, a number of actions 52A-52D have been identified for the attachment 46A. In particular, the action 52A allows the attachment to be saved to the mass storage device 14, the action 52B causes a slide show to be generated and displayed for the attachments 46A-46C, the action 52C causes the previewed attachment 46A to be printed, and the action 52D causes the attachment 52D to be deleted.

It should be appreciated that many different types of actions may be identified for each file type. For instance, a slide show action may be made available for pictures and presentation documents, actions may be made available for accepting or declining attached meeting requests, attached contact files may be added to a contacts list in a personal information manager, playback controls may be displayed for audio files, and actions may be provided for displaying attached facsimile documents. Other actions may also be displayed that are appropriated for all file types, such as opening, saving, deleting, and printing. In one embodiment, only the actions specific to a particular file type are displayed adjacent to the preview 50. Other actions common to all file types may be displayed in a tool bar 54. When multiple attachments are selected, the header and the preview shown may be for the first attachment. Only the actions that are available for all of the selected attachments will be displayed in proximity to the preview 50.

Figure 3:
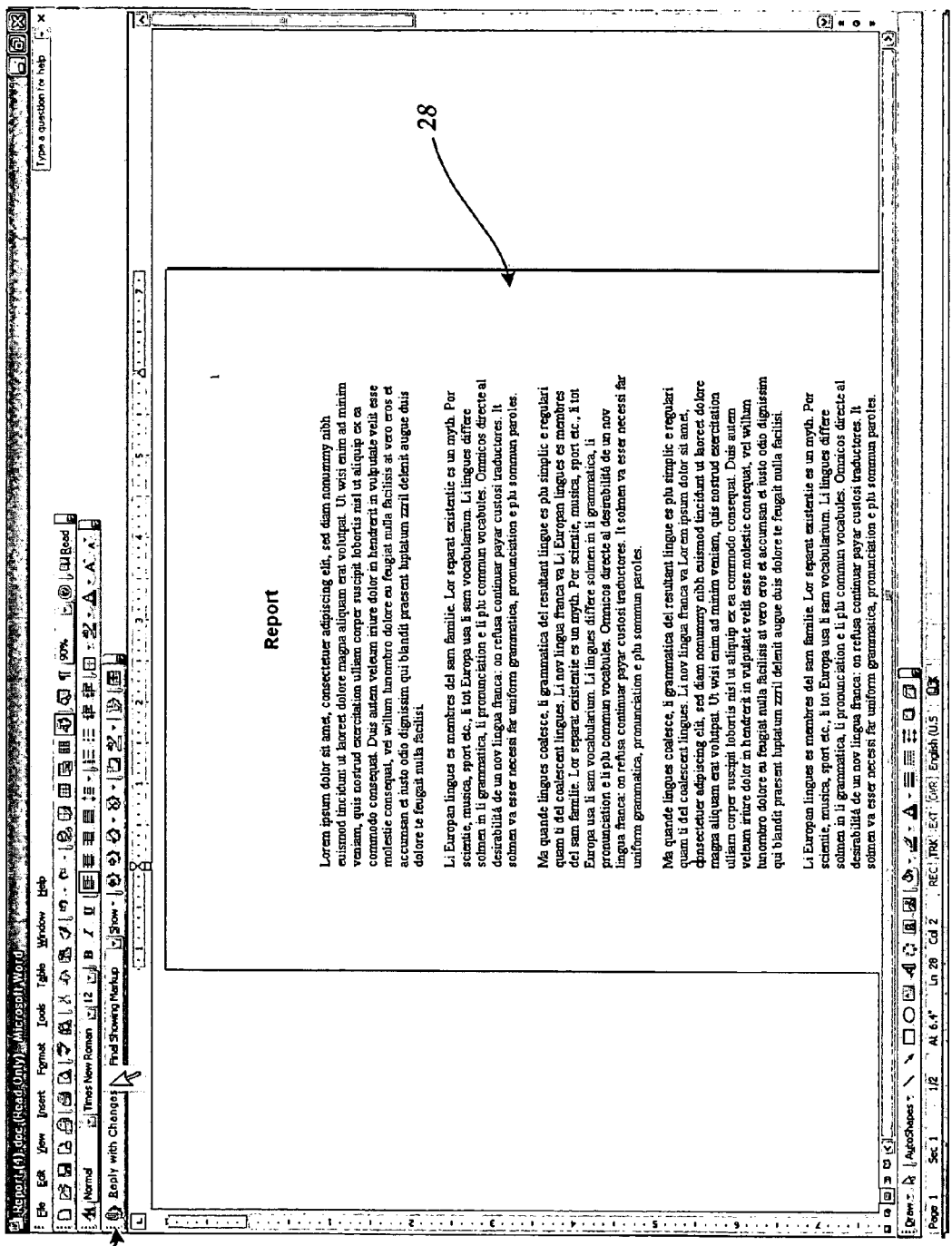

Referring now to FIG. 3, another illustrative user interface provided by the various embodiments of the invention will be described. In particular, FIG. 3 shows a screen display 60 generated by a word processing application utilized in conjunction with the various embodiments of the present invention. As described above, according to embodiments of the invention, an action may be provided for certain types of attached documents that allows a user to quickly edit the attachment and transmit a reply e-mail that includes the changed document as an attachment. In response to the selection of such an action, the word processing application program is launched for editing with the attached document. The screen display 60 shown in FIG. 3 illustrates the screen display shown by the word processing application once it has been launched in this manner.

As shown in FIG. 3, the word processing application program provides the conventional tools for editing the document 28. "Reply with changes" button 62 is also displayed in conjunction with the user interface for editing the document 28. Selection of the button 62 causes a reply message to be generated with the e-mail fields populated and the document 28 attached. The user may then edit the contents of the reply message and send the message. By integrating the e-mail client application 24 and the word processing application in this manner, a user is freed from the tedious process for editing documents attached to e-mail messages required by previous e-mail client applications.

It should be appreciated that although the embodiment of the invention described herein is presented in the context of a word processing application program, other types of applications program may also be used similarly. For instance, if an e-mail message includes a presentation document as an attachment, a presentation program may be launched in response to a request to transmit a reply message including a modified attachment. Any other type of document may be edited and transmitted in a similar manner.

Figure 4:
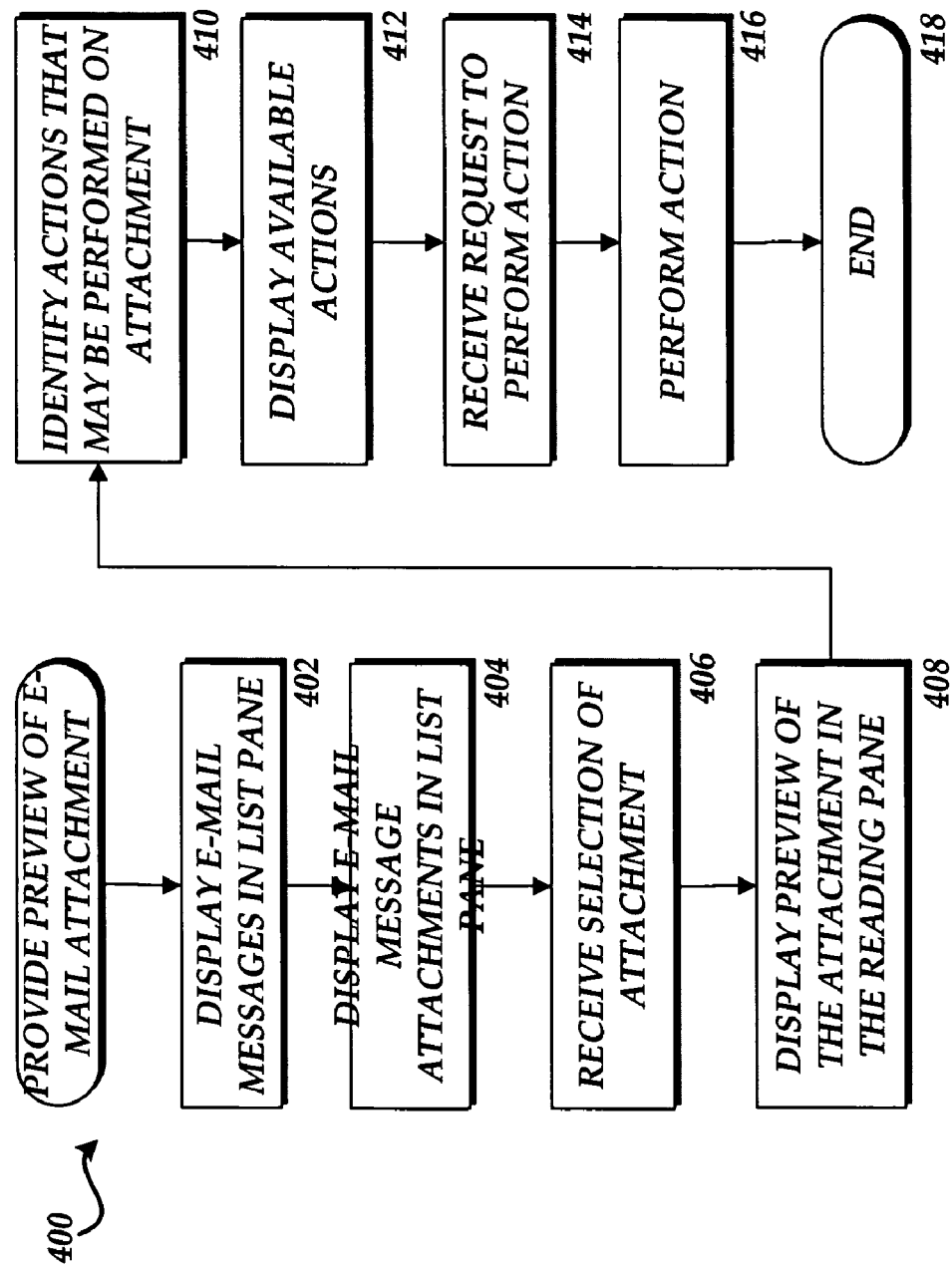
FIGS. 4 and 5 are flow diagrams illustrating various processes provided by the several embodiments of the invention.

Referring now to FIG. 4, an illustrative routine 400 will be described illustrating a process performed by the e-mail client application 24 for previewing and performing actions on attachments to e-mail messages. It should be appreciated that although the embodiments of the invention described herein are presented in the context of an e-mail client application program 24, the invention may be utilized in other types of application programs.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 402, where the e-mail client application 24 displays e-mail messages in the list pane 42. The routine 400 then continues to operation 404, where the documents attached to the e-mail messages shown in the list pane are also displayed. The attachments may be displayed in the manner described above with respect to FIG. 2. From operation 404, the routine 400 continues to operation 406.

At operation 406, the e-mail client application 24 receives the user selection of an attachment to an e-mail message. In response to the selection, the e-mail client application 24 instructs the preview handler 32 to identify a previewer for the attachment and to generate a preview of the attachment. The generated preview is then displayed by the e-mail client application 24 in the reading pane 48 at operation 408. From operation 408, the routine 400 continues to operation 410.

At operation 410, the e-mail client application 24 identifies the actions that may be performed on the attachment. User interface objects, such as buttons, are then displayed for the identified actions adjacent to the preview 50. This occurs at operation 412. From operation 412, the routine 400 continues to operation 414, where a request is received from the user to perform one of the displayed actions. The request may be made, for instance, through a selection of one of the displayed user interface objects. The routine 400 then continues to operation 416, where the requested operation is performed. From operation 416, the routine 400 continues to operation 418, where it ends.

Figure 5:
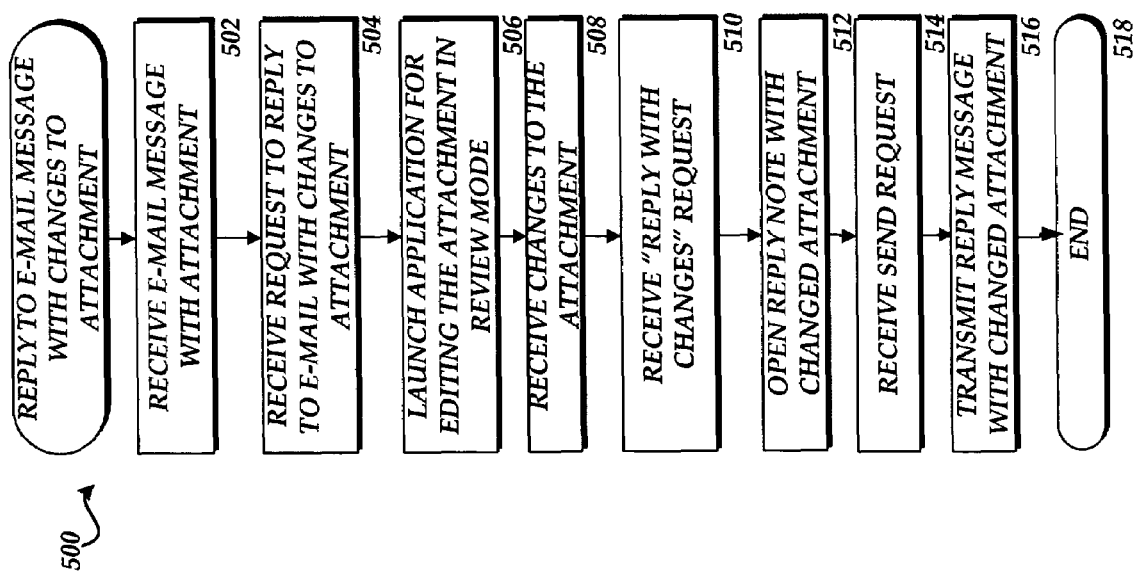

Turning now to FIG. 5, an illustrative routine 500 will be described for performing an action for replying to an e-mail message with changes to an attached document. The routine 500 begins at operation 502, where an e-mail message having an attachment is received by the e-mail client application 24. From operation 502, the routine 500 continues to operation 504, where a request is received to reply to the original e-mail with changes to the attached document. This request may be made, for instance, through a user selection of one of the actions associated with a preview. From operation 504, the routine 500 continues to operation 506.

At operation 506, the e-mail client application 24 launches an application program associated with the attachment. For instance, if the attachment comprises a word processing document, the e-mail client application 24 may launch a word processing application for editing the document. The application program may also be launched in a state specifically designated for reviewing and modifying documents. Such a state is commonly referred to as a "review" mode and provides functionality for making document modifications in a manner that allows the modifications to be easily identified and read by another user.

As described briefly above, the application program may also be launched in a manner to cause the "reply with changes" button 62 to be displayed in conjunction with the editing screen. This occurs at operation 506 and allows a user to easily and quickly transmit the changed document as a reply to the original e-mail message. From operation 508, the routine 500 continues to operation 508, where changes to the attached document are received from the user. The routine 500 then continues to operation 510, where a request is received from the user to transmit the reply e-mail message including the changed document through the selection of the button 62.

In response to receiving the request to transmit the reply e-mail including the changed document, the routine 500 continues to operation 512 where a reply message is created with the changed document attached. The user can then add comments. If the user indicates the message should be sent, the routine continues to operation 516, where the e-mail client application transmits the reply e-mail with the changed document attached. The application program is closed and the user is returned to the display provided by the e-mail client application 24. The user may then preview other documents and interact with the e-mail client application 24 in the manner described herein. From operation 514, the routine 500 continues to operation 518, where it ends.

Based on the foregoing, it should be appreciated that the various embodiments of the invention include a method, system, apparatus, and computer-readable medium for previewing and performing actions on attachments to e-mail messages. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium having computer-executable instructions stored thereon which, when executed by a computer, will cause the computer to:
    receive an electronic mail message having a document attached thereto;
    receive a request to reply to the electronic mail message with changes to the document;
    in response to the request, launch an application program for editing the document in a review mode, open the document in the application program for editing, and provide a user interface object for replying to the electronic mail message with a changed version of the document;
    receive changes to the document via the application program;
    receive a request to transmit the changed document via the user interface object; and
    transmitting the changed document as a reply to the electronic mail message.

2. A method for providing a visual preview of a document attached to an electronic mail message, the method comprising:
    displaying header information associated with the electronic mail message;

displaying an indication that the document is attached to the electronic mail message;

receiving a selection of the indication;

in response to receiving the selection of the indication, displaying a preview of the document without requiring a context; and identifying one or more actions that may be performed on the document and displaying the one or more actions in conjunction with the preview wherein the actions are identified based upon a file type for the document wherein the file type comprises a word processing document and wherein the action corresponding to the file type comprises launching a word processing application with the document, placing the word processing application in a review mode, receiving chances to the electronic document, receiving a user request to transmit the changed document, and transmitting the changed document.

3. The method of claim 1, wherein the header information associated with the electronic mail message is displayed in a list pane, wherein the preview of the document is displayed in a reading pane, and wherein the list pane and the reading pane are displayed adjacent to one another.

4. The method of claim 1, wherein displaying the one or more actions in conjunction with the preview comprises displaying one or more user interface objects corresponding to the actions adjacent to the preview.

5. The method of claim 1, wherein the file type comprises a picture and wherein the action corresponding to the file type comprises displaying a slide show including the picture.

6. A method for providing a visual preview of a document attached to an electronic mail message, the method comprising:

displaying a first window pane identifying one or more electronic mail messages;

determining that an electronic mail message identified in the first window pane has one or more attachments;

in response to determining that an electronic mail message has attachments, displaying an indication for each of the attachments in the first window pane, the indication being selectable;

displaying a second window pane adjacent to the first window pane for reading the electronic mail message when the electronic mail message is selected;

receiving the selection of the indication for an attachment;

in response to the selection of the indication, displaying a preview of the attachment in the second window pane, the preview displayed without requiring a context switch;

receiving a request to reply to one of the one or more electronic mail messages with changes to the one or more attachments to the electronic mail message;

in response to the request, launch an application program for editing the one or more attachments in a review mode, open the one or more attachments in the application program for editing, and provide a facility for replying to one of the one or more electronic mail messages with a changed version of the one or more attachments;

receiving changes to the one or more attachments via the application program;

receiving a request to transmit the changed one or more attachments via the electronic mail message envelope; and transmitting the chanced one or more attachments as a reply to the electronic mail message.

7. The method of claim 6 further comprising identifying one or more actions that may be performed on the one of the one or more attachments and displaying the one or more actions in conjunction with the preview.

8. The method of claim 7, wherein displaying the one or more actions in conjunction with the preview comprises displaying one or more user interface objects corresponding to the actions adjacent to the preview.

9. The method of claim 8, wherein the actions are identified based upon a file type for the one of the one or more attachments.

* * * * *